United States Patent
Castaneda et al.

Patent Number: 5,421,360
Date of Patent: Jun. 6, 1995

[54] FLOAT ASSISTED AUTOMATIC DRIPTRAP

[75] Inventors: Louis R. Castaneda; Milton N. Anderson, Jr., both of Houston, Tex.

[73] Assignee: Groth Corporation, Houston, Tex.

[21] Appl. No.: 58,422

[22] Filed: May 7, 1993

[51] Int. Cl.⁶ ............................................. F16K 31/22
[52] U.S. Cl. .................................... 137/192; 137/433; 137/549; 251/87
[58] Field of Search ............... 137/192, 549, 202, 433, 137/550, 544; 251/86, 87

[56] References Cited

U.S. PATENT DOCUMENTS

| Re. 21,741 | 3/1941 | Samiran | 251/87 X |
| 1,981,965 | 11/1934 | Morgan | 137/192 X |
| 2,050,041 | 8/1936 | Czarnecki | 137/549 X |
| 2,522,220 | 9/1950 | Glick | 137/192 X |
| 4,301,827 | 11/1981 | Murthy et al. | 137/192 X |
| 4,327,764 | 5/1982 | Biederman et al. | 137/192 |
| 4,708,157 | 11/1987 | Sabatino | 137/192 X |
| 4,959,141 | 9/1990 | Anderson | 137/549 X |

FOREIGN PATENT DOCUMENTS

10276  6/1909  France .................... 251/87

OTHER PUBLICATIONS

Groth Corporation, Groth Digester Gas Control Publication, Two Pages.
VAREC Division of Rosemount, Inc., 245 Series Automatic Drip Trap Publication Two Pages, 1988.

Primary Examiner—Martin P. Schwadron
Assistant Examiner—Kevin L. Lee
Attorney, Agent, or Firm—Bush, Moseley, Riddle & Jackson

[57] ABSTRACT

A vertically oriented float assisted automatic driptrap mechanism having a float valve chamber defined by a body section and base is disclosed. A float is located for vertical liquid level responsive movement within the float valve chamber and reciprocates within a valve stem float guide. A diffuser is provided at the inlet of the chamber to prevent impingement of incoming fluid on the float. The valve stem guide also serves as a filter support for a filter which filters out contaminants that might interfere with the valving action of the driptrap mechanism. A valve seat having a tapered seat surface and a self-positioning valve plug movably supported by the valve stem and having a differently tapered sealing surface establish line contact sealing to ensure effective valve operation under high pressure conditions.

21 Claims, 1 Drawing Sheet

FLOAT ASSISTED AUTOMATIC DRIPTRAP

FIELD OF THE INVENTION

This invention relates generally to automatic driptraps for fluid handling systems which respond to a predetermined level of liquid that is collected within a float chamber to permit float actuated automatic discharge of the collected liquid into a receiving line. More particularly, the present invention is directed to the provision of a float assisted automatic driptrap mechanism which is specifically designed to achieve bubble tight sealing within its service pressure range and for achieving efficient operation even when the float controlled valve mechanism thereof is subjected to relatively high working pressure.

BACKGROUND OF THE INVENTION

Historically float actuated automatic driptraps tend to be designed with the axis of the float in the horizontal position so that as it rises and falls typically with a pivotal movement in response to the liquid level within the float chamber, its horizontal actuating shaft applies force to a pivotal valve actuator lever to provide for seating and unseating forces of a valve element such as a valve plunger which seats against an internal valve seat. The sealing components of such automatic driptraps are typically constructed of steel and are arranged to form a metal-to-metal seal. The maximum working pressure of driptrap valves of this type is normally about 5 PSIG, and on special applications up to 25 PSIG. With the metal-to-metal seat design that is typically used in conventional driptraps, leakage is typically expected and accepted in the waste water treatment industry. At the higher working pressures, i.e. in the range of 25 PSIG, conventional driptrap valve mechanisms will not operate properly to achieve absolute sealing capability and thus will leak a considerable amount. This is also considered acceptable at the present time in the waste water treatment industry.

It is desirable to provide a float energized automatic driptrap mechanism that is capable of providing improved performance in comparison with existing float operated automatic driptrap devices, specifically related to achieving bubble tight sealing capability and providing for efficient and effective valve operation even when the valve is subjected to relatively high working pressure.

SUMMARY OF THE INVENTION

It is a principle object of the present invention to provide a novel float energized automatic driptrap mechanism having a float that is vertically movable within a float chamber and which achieves vertical movement of a valve stem and plug relative to a valve seat.

It is another object of the present invention to provide a novel float energized automatic driptrap mechanism having a valve seat and valve plug that are arranged to establish line contact sealing when the valve plug is in its closed position relative to the valve seat.

It is an even further object of the present invention to provide a novel vertically oriented float operated automatic driptrap mechanism having a lower axial guide stem and low friction stem guide assembly which permits the float to be efficiently responsive to liquid level within the float chamber.

It is also an object of this invention to provide a novel vertically oriented float energized automatic driptrap assembly wherein the discharge opening that is controlled by the valve plug and valve spat is located sufficiently below the level of the float that liquid remains within the float chamber when the valve plug is caused to establish seating with a valve seat, thus preventing air or other gases from being discharged from the float chamber as collected liquid is being discharged therefrom.

It is an even further object of the present invention to provide a novel float energized automatic driptrap assembly which ensures against the discharge of debris from the float chamber through the open valve and discharge opening in the event the automatic driptrap assembly is being utilized in relatively dirty liquid applications.

It is another object of this invention to provide a novel float energized automatic driptrap assembly having an internal diffuser at the inlet thereof to ensure against impingement of incoming liquid onto the float where it might otherwise cause premature closure of the seat plug at high working pressures.

Briefly, the various objects identified above, together with other features and objects which will become apparent upon a thorough understanding of the present invention, are realized through the provision of a float assisted automatic driptrap assembly that is provided with a driptrap body housing structure having a base and body which define respective fluid inlet and outlet openings. The body housing structure defines an internal float valve chamber within which is received a float which is vertically movable within the chamber responsive to the level of collected liquid contained therein. At the upper portion of the body housing, a diffuser is positioned within the float chamber and is supported by the body housing structure and serves to direct incoming liquid, especially at relatively high velocity, so that it does not impinge directly upon the float and thus does not influence the liquid level induced closing force to which the float is subjected.

Within the base a valve seat is disposed in fixed relation with the housing structure and is located within an internal receptacle defined by a guide housing. A valve stem projects downwardly from the float and is movably received in guided relation by a vertically oriented guide passage of the guide housing. The float actuated valve stem is guided by a low friction bushing of the guide housing which defines the vertically oriented guide passage and is movable vertically relative to the valve seat. A valve plug is connected at the lower portion of the valve stem and includes a tapered lower extremity which is received in guided relation with respect to a tapered valve seat surface of the valve seat. Differing tapers are defined by tapered lower extremities of the valve plug and the tapered surface of the valve seat thus causing a circular line contact sealing to be established.

A filter screen is arranged exteriorly of the guide housing and serves to filter fluid passing from the float chamber through the open valve seat such as when the driptrap mechanism is being utilized in relatively dirty fluid handling conditions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings:

FIG. 1 is a sectional view of a vertically oriented float energized driptrap assembly that is constructed in accordance with the teachings of the present invention and represents the preferred embodiment.

FIG. 2 is a partial sectional view of the driptrap assembly of FIG. 1 illustrating the valve mechanism thereof in detail.

DETAILED DESCRIPTION OF PREFERRED EMBODIMENT

Figure 1:
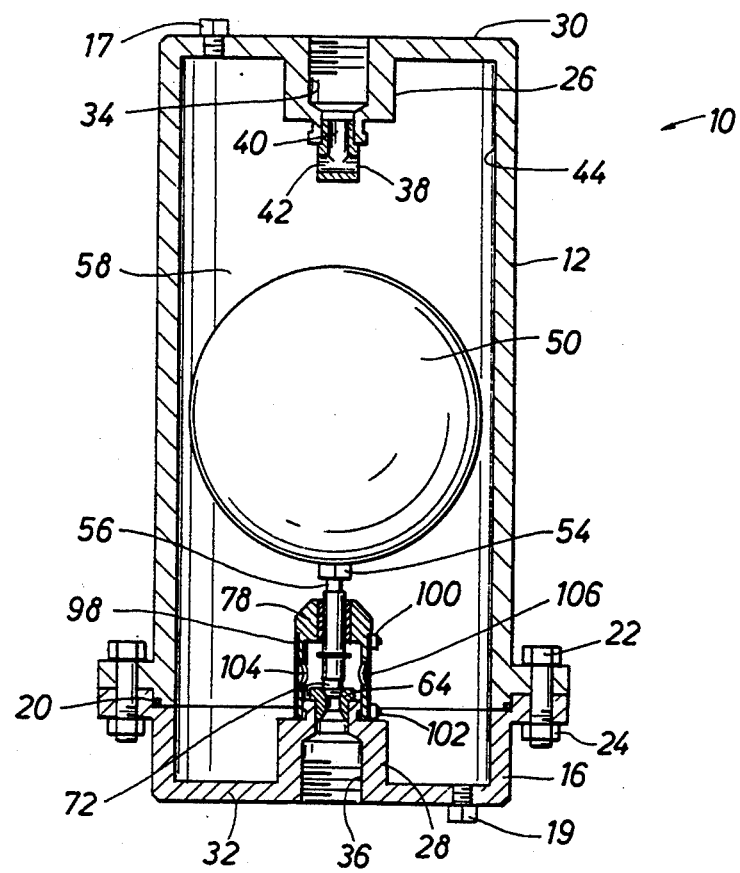

Referring now to the drawings and first to FIG. 1 a vertically oriented float energized automatic driptrap assembly is shown generally at 10 and includes a tubular body housing section 12 and base 16 which are maintained in sealed relation by means of circular sealing element such as resilient O-ring seal 20 which is received within a circular seal recess. The base and body are secured in assembly by means of a plurality of hex bolts 22 having hex nuts 24 threadedly connected at flanges thereof. The body 12 and base 16 may also be provided with externally accessible access or drain plugs 17 and 19 respectively to enable release of gases, draining of liquid or other servicing activities to be conducted without requiring the opening of the housing or removal of the driptrap apparatus from the inlet and discharge lines. It should be appreciated that top and bottom closure members could be provided for base 16 rather than the preferred embodiment of FIG. 1 where a cast body 12 is closed only by a bottom base member 16.

The body 12 and base 16 respectively define integral bosses 26 and 28 which project inwardly from respective end walls 30 and 32. The bosses 26 and 28 define internally threaded inlet and outlet openings 34 and 36 respectively, which are adapted to receive suitable inlet and discharge piping for connection of the driptrap assembly into drip collection and discharge lines. Within the inlet opening of the inlet boss 26 is provided a diffuser 38 having an internal diffuser passage defined by a vertically oriented passage section 40 in communication with the inlet opening 34 and a lateral diffuser passage section 42 having laterally oriented openings that direct inlet fluid toward the internal wall surface 44 of the body housing section 12. The diffuser 38 may be connected to the boss 26 by threading, press fitting or by any other suitable means. A lock nut and washer assembly 54 is provided to secure a valve stem 56 in threaded assembly with the float 50 as shown in FIG. 1 and also shown in detail in FIG. 2.

Figure 2:
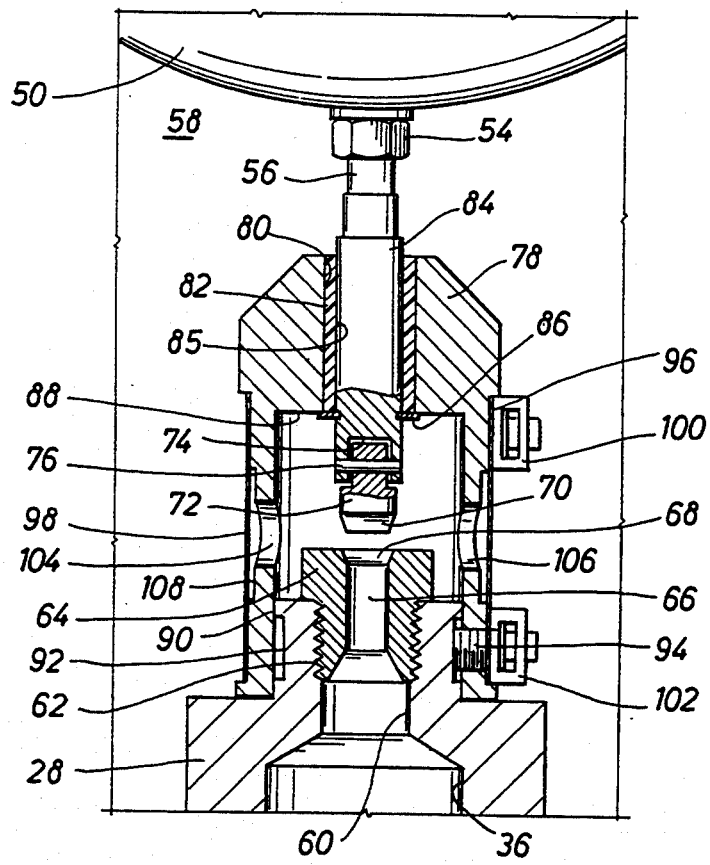

As shown in detail in FIG. 2 the upwardly projecting boss 28 defines a vertically oriented discharge passage 60 having an upper portion thereof internally threaded as shown at 62 for receiving an externally threaded seat bushing 64. The seat bushing defines a centrally located, vertically oriented passage 66 and also defines a tapered or conical upwardly directed seat recess or surface 68 against which is adapted to seat the tapered or conical lower external portion 70 of a valve plug 72 which is secured within a plug receptacle 74 of the valve stem 56 by means of a spring pin 76 which extends through registering apertures defined in the lower extremity of the valve stem. The valve plug 72 is loosely received within the receptacle 74 and thus is allowed some degree of lateral movement within the receptacle and pivotal movement with respect to the mounting pin 76 so as to permit the valve plug to have substantially omnidirectional movement for seeking optimum seating relation with respect to the tapered seat surface 68. Further, the conical tapers of the surfaces 68 and 70 may be different so as to permit circular line contact seating of the seat plug 72 relative to the seat surface 68. This feature enhances the sealing capability of the valve plug and seat at a wide range of sealing pressure conditions.

The driptrap mechanism is provided with a valve guide housing 78 having an internal vertically oriented passage 80 within which is received a valve guide bushing 82 composed of a low friction material such as polytetrafluoroethylene such as is sold by E. I. Dupont under the registered trademark "Teflon". The valve stem 56 includes a large diameter section 84 which extends in efficient close fitting guided relation through a vertically oriented guide passage 85 of the Teflon bushing 82. The low friction character of the guide bushing 82 also enhances the responsiveness of float movement to liquid level changes. For the purpose of limiting upward movement of the float 50, the valve stem 56 is provided with a stop 86 in the form of a split snap ring which is received within a circular external groove defined by the valve stem. The stop 86 is oriented to contact the downwardly directed internal shoulder 88 of the stem guide housing 78 when the float and valve stem have moved upwardly to the desired maximum extent thereof.

For assembly of the stem guide housing 78 to the upwardly projecting boss 28, the boss defines a reduced diameter annular upper portion 90 which defines a circular external retainer groove 92. A set screw 94 or other suitable retainer extends through a threaded opening of the lower extremity of the guide housing as shown and is received in restraining relation within the groove 92. Obviously more than a single set screw may be utilized for securing the guide housing to the internal boss if desired.

Externally, the stem guide housing 78 defines a reduced diameter section 96 enabling a generally cylindrical filter screen to be secured externally thereof by upper and lower filter clamps 100 and 102. The stem guide housing 78 also defines a pair of opposed fluid entry ports 104 and 106 which are positioned intermediate a centrally oriented annular recess 108 and which permit the filter 98 to have annular standoff intermediate its extremities from the external wall surface of the recess 108. In the event a dirty fluid is being handled by the driptrap mechanism and tends to build up on the filter immediately opposite the entry ports 104 and 106, the fluid can enter the recess 108 at any portion about the periphery of the filter and thus flow to the inlet ports. This will minimize the frequency of periodic maintenance of the filter when the driptrap mechanism is being utilized in relatively dirty fluid handling conditions.

OPERATION

When the valve plug 72 is positioned by the valve stem 56 and float 50 as shown in FIG. 2, any fluid within the chamber 58 of the driptrap mechanism will be permitted to flow through the filter screen 98 and through the inlet ports 104 and 106 to the valve seat opening 68. The collected fluid will then exit through passage 66 of the seat bushing 64 and through the appropriate discharge line that is coupled with the internally threaded receptacle 36. As the fluid level within the chamber 58 descends, the float 50 also descends, thereby moving the valve plug 72 toward its seated relation with the tapered seat surface 68. At a point where significant liquid level exists in the chamber 58 to position the liquid gas interface well above the valve seat 68 to thus prevent any gas from exiting through the valve mechanism, the valve plug 72 will move into seated, line sealing contact relation with respect to the tapered seat surface 68. As mentioned above, the valve plug 72 has sufficient degree of lateral and pivotal movement relative to the valve stem that it will seek optimum seating relationship with respect to the tapered valve seat 68. The circular line contact seating relation of the valve plug relative to the valve seat, and the fact that the valve plug has substantially omnidirectional movement relative to its valve stem, ensures that the tapered sealing surface of the valve plug can establish optimum seating relation with the valve seat so as to enable the valve mechanism to establish optimum sealing even under a wide range of pressure conditions, including relatively high pressure.

After the valve plug has become seated against the tapered valve seat 68, the liquid level will begin to rise within the float valve chamber 58. As the liquid level rises, its upwardly directed force on the float 50 increases. When such force on float 50 exceeds the seating force of the valve plug against the valve seat, the valve plug will suddenly be unseated from the valve seat, and the float will quickly move upwardly to the position shown in FIG. 2 thus fully opening the driptrap valve mechanism for efficient discharge flow therethrough. The presence of the vertically oriented valve stem 56, together with the presence of the low friction Teflon bushing 82 provides the float with efficient responsiveness to liquid level. The automatic driptrap mechanism of this invention is therefore capable of providing improved performance in comparison with existing float assisted driptrap devices and is capable of achieving bubble tight sealing and achieving efficient operation even when the valve mechanism is subjected to relatively high working pressure.

Since certain changes or modifications may be made in the disclosed embodiment without departing from the inventive concepts involved, it is the aim of the appended claims to cover all such changes and modifications falling within the true spirit and scope of the present invention.

What is claimed is:

1. A float assisted automatic driptrap mechanism, comprising:
    (a) a tubular body housing having upper and lower opposed end walls defining a float valve chamber therebetween, said upper end wall having an inwardly projecting upper boss defining an internally threaded fluid inlet inwardly of said upper end wall and said lower end wall having an integral inwardly projecting lower boss defining an internally threaded fluid outlet inwardly of said lower end wall;
    (b) a float being movably disposed within said float valve chamber and having a valve stem projecting downwardly therefrom;
    (c) a valve seat on said lower boss being disposed in fixed relation with said body housing and being located within said float valve chamber; and
    (d) a valve plug element being provided at the lower end of said valve stem and being disposed for sealing engagement with said valve seat when said float is at its lowermost position within said float valve chamber, said valve plug element becoming unseated from said sealing engagement with said valve seat when said float is moved upwardly responsive to the force of buoyancy when the liquid level within said float valve chamber reaches a sufficient level that the force of buoyancy thereof exceeds the seating force of said valve plug element against said valve seat; said valve plug being supported for substantial pivotal movement relative to said valve stem and thus being movable into optimum sealing relation with said valve seat upon contact with said valve seat.

2. The float assisted automatic driptrap mechanism of claim 1, including:
    a lower float stem guide disposed substantially coaxially within said body housing and arranged for receiving said valve stem in movable guided relation therein.

3. The float assisted automatic driptrap mechanism of claim 1, including:
    a diffuser element projecting from said upper boss into said float valve chamber and defining a diffuser passage disposed in fluid communication with said fluid inlet of said upper boss, said diffuser passage being oriented to discharge fluid into said float valve chamber in a manner substantially preventing direct impingement of inlet fluid on said float.

4. The float assisted automatic driptrap of claim 1, wherein said tubular body housing comprises:
    (a) a generally cylindrical body section including said upper end wall; and
    (b) a base including said lower end wall connected in sealed relation with said body section and cooperating with said body section for defining said float valve chamber.

5. The float assisted automatic driptrap of claim 1, wherein:
    (a) said valve seat defines a tapered seat surface; and
    (b) said valve plug defines a tapered seat surface having a different taper as compared to said tapered seat surface and thus enabled to establish circular line contact sealing with respect to said tapered seat surface.

6. The float assisted automatic driptrap of claim 1, including:
    (a) a valve stem guide housing supported on said integral lower boss within said float valve chamber and defining an enclosure for said valve seat and valve plug;
    (b) at least one entry port defined by said valve stem guide housing and permitting flow of fluid from said float valve chamber to said valve seat; and
    (c) a filter assembled about a portion of said valve stem guide housing and positioned to filter fluid flowing from said float valve chamber through said entry port to said valve seat.

7. The float assisted automatic driptrap of claim 6, wherein:
said valve stem guide housing defines an external annular recess radially outwardly of said entry port and communicating therewith for causing at least a portion of said filter to be disposed in spaced annular relation with an external surface portion of said valve stem guide housing and thus permitting flow of fluid through said filter screen into the annular space between said filter screen and said external surface portion of said valve stem guide housing and thence to said entry port.

8. The mechanism of claim 1 wherein:
said valve plug is further supported for limited lateral movement with respect to said valve stem and thus further being movable into optimum seating relation with said valve seat upon contact with said valve seat.

9. The mechanism of claim 1 wherein:
said valve stem includes a receptacle at its lower end; and
said valve plug is pivotally supported within said receptacle be means of a mounting pin.

10. The mechanism of claim 8 wherein:
said valve stem includes a receptacle at its lower end, said receptacle having an inner diameter, said valve plug being loosely received within said inner diameter of said receptacle and being supported therein.

11. The mechanism of claim 10 wherein:
said plug is pivotally supported within said receptacle by means of a mounting pin.

12. A float assisted automatic driptrap comprising:
 (a) an outer tubular housing having closed upper and lower end walls defining a float valve chamber therebetween, said upper end wall having a :fluid inlet and said lower end wall having an integral inwardly projecting lower boss with a fluid outlet therein;
 (b) a lower stem guide positioned on said lower boss in fixed relation within said float valve chamber;
 (c) a valve seat supported in fixed relation on said lower boss within said float valve chamber and disposed in fluid communication with said fluid outlet;
 (d) a float movably disposed within said float valve chamber and having a downwardly projecting valve stem having a lower end and disposed in guided relation with said lower stem guide;
 (e) a valve plug supported by said lower end of said valve stem and being substantially omnidirectionally movable relative to said valve stem and valve seat so as to be movable into optimum seating and sealing relation with said valve seat upon contact therewith, wherein said valve plug is supported for limited lateral movement with respect to said valve stem and thus being movable into optimum sealing relation with said valve seat upon contact with said valve seat;
a valve stem guide housing supported on said lower boss within said float valve chamber and having a laterally extending entry port to permit flow of fluid from said fluid valve chamber to said valve seat; and
a filter assembled to said valve stem guide housing to filter fluid flowing from said float valve chamber through said entry port;
said valve stem guide housing having an annular external recess surrounding said entry port and communicating with said entry port, said filter positioned about said annular recess adjacent said entry port and spaced by said valve stem housing from said entry port to permit flow of fluid through said filter into the space formed by said annular recess and thence to said entry port.

13. The float assisted automatic driptrap of claim 12, wherein:
 (a) said valve seat defines a conical internal seat surface having a predetermined taper; and
 (b) said valve plug has a conical external sealing surface having a taper differing from said predetermined taper of said conical internal seat surface to thus enable substantially circular line contact sealing therebetween.

14. The float assisted automatic driptrap of claim 12, wherein:
a fluid inlet diffuser is supported in fixed relation from said upper end wall within the upper portion of said housing and defines a diffuser passage directing inlet fluid in a manner preventing its impingement on said float.

15. The float assisted automatic driptrap of claim 12, wherein said outer housing comprises:
 (a) a central body section including said upper end wall; and
 (b) a base including said lower end wall connected in sealed relation with said body section and cooperating with said central body section for defining said float valve chamber.

16. The mechanism of claim 12 wherein said valve plug is further supported for substantial pivotal movement relative to said valve stem and thus being further movable into optimum and sealing relation with said valve seat upon contact with said valve seat.

17. The mechanism of claim 16 wherein:
said valve stem includes a receptacle at its lower end; and
said valve plug is pivotally supported within said receptacle be means of a mounting pin.

18. The mechanism of claim 12 wherein:
said valve stem includes a receptacle at its lower end, said receptacle having an inner diameter, said valve plug being loosely received within said inner diameter of said receptacle and being supported therein.

19. The mechanism of claim 18 wherein:
said plug is pivotally supported within said receptacle by means of a mounting pin.

20. A float assisted automatic driptrap comprising:
 (a) an outer tubular housing having closed upper and lower ends defining a float valve chamber therebetween, said upper end having a fluid inlet and said lower end having an inwardly projecting lower boss with a fluid outlet therein;
 (b) a lower stem guide supported by said lower boss and positioned in fixed relation within said float valve chamber;
 (c) a valve seat supported in fixed relation on said lower boss and located within said float valve chamber, said valve seat defining a discharge passage disposed in fluid communication with said fluid outlet;
 (d) a float movably disposed within said float valve chamber and having a downwardly projecting valve stem having a lower end and disposed in guided relation with said stem guide;

(e) a valve plug supported by said lower end of said valve stem and being substantially universally movable relative to said valve stem and valve seat so as to be movable into optimum seating and sealing relation with said valve seat upon contact therewith;

(f) said stem guide enclosing said valve seat and valve plug and defining at least one laterally extending port permitting flow of liquid from said float valve chamber to said valve seat, said stem guide further having a low friction insert defining a valve stem guide passage within which said valve stem is movable in guided relation; and (g) a cylindrical filter secured at spaced lower and upper ends thereof about said stem guide and said port for filtering fluid flow from said float valve chamber through said port of said stem guide, said filter spaced laterally from said port and defining an annular recess between said filter and said port to permit flow of fluid into said annular recess prior to entering said port.

21. The float assisted automatic driptrap of claim 20, wherein:

(a) said valve seat defines a conical internal seat surface having a predetermined taper; and (b) said valve plug defines a conical external sealing surface having a taper differing from said taper of said conical internal seat surface to thus enable substantially circular line contact sealing therebetween.

* * * * *